United States Patent [19]

Garver et al.

[11] 4,338,051
[45] Jul. 6, 1982

[54] PROFILE CUTTING MACHINE

[75] Inventors: Richard F. Garver; Srbo M. Stevanovich, both of Akron, Ohio

[73] Assignee: The B. F. Goodrich Company, Akron, Ohio

[21] Appl. No.: 155,730

[22] Filed: Jun. 2, 1980

[51] Int. Cl.³ .......................... B23C 3/30; B23C 5/12
[52] U.S. Cl. ...................................... 409/184; 83/488;
144/90 A; 144/133 R; 144/136 R; 409/197;
409/202
[58] Field of Search ............... 409/184, 197, 201, 202,
409/205; 144/133 R, 134 R, 136 R, 90 R, 90 A;
83/484, 488

[56] References Cited

U.S. PATENT DOCUMENTS

| | | | |
|---|---|---|---|
| 2,823,749 | 2/1958 | Chamberlain | 83/484 |
| 2,951,517 | 9/1960 | Webb et al. | 144/133 R |
| 3,036,605 | 5/1962 | Joa | 144/133 R |
| 3,672,415 | 6/1972 | Holan | 144/136 R |
| 4,069,729 | 1/1978 | Kutz | 83/488 |

*Primary Examiner*—Z. R. Bilinsky
*Attorney, Agent, or Firm*—Joseph Januszkiewicz

[57] ABSTRACT

A machine for cutting a profile into the respective ends of a flat rectangular piece of rubberized material having a clamping table with an overhead reciprocating carriage that has a rotating profile cutter that cuts an interlocking profile at a single pass into such material.

2 Claims, 4 Drawing Figures

PROFILE CUTTING MACHINE

BACKGROUND OF THE INVENTION

This invention relates to a new and improved apparatus used in the making of a sleeve or bladder which is used in the curing of belts and power transmission belting of the V-type.

Power transmission belts are generally made of elastomeric material containing an endless tension core which is generally formed from fabric cord and may at times be formed from stranded metal cables. In the manufacture of such power transmission belts it is essential to maintain a tensional strain on the belt during the curing process to minimize stretch when the belt is in use. The apparatus used to effect the cure of such belts includes an expandible bladder which must maintain sufficient radial pressure to effect the proper tensioning during the cure of the belt. To cure the V-belts or power transmission belting, the individual endless V-belts are stacked into a cylindrical tank or housing which will have an expandable cylindrical bladder or sleeve located radially inwardly thereof such that upon heating of the V-belts and upon pressurization of the bladder, sufficient pressure is exerted radially outwardly on the bladder to subject the V-belt to an even outward tension during cure. Steam pressure is used to cure the belts and a differential in pressure develops between the outer and inner surfaces of the bladder or sleeve such that leaks develop at the splice of the cylindrical bladder or sleeve which will ruin the production run because there is insufficient pressure exerted radially outwardly by the bladder to effect the proper tensioning of the belt for proper cure and shaping. The bladder used in such curing is essentially a cylindrical rubber sleeve which is made from a flat rectangular piece of rubber material. The respective ends of such sleeve material have been bias cut and then spliced by an overlapping tapered splice. It has been found desirable to provide an interlocking splice to make the sleeve rather than a bias or tapered splice to enhance the quality of the sleeve. Such splices extends the life of the curing bladders considerably and have eliminated costly down times for repairs.

The present invention is directed to an apparatus for efficiently cutting the interlocking cut on the respective ends of the flat sleeve material which is done on a single pass of the sleeve with a minimum of power consumption.

SUMMARY OF THE INVENTION

This invention comprises a support member which clamps the end of a flat yieldable member on a horizontal work surface. An overhead carriage with a rotatable profile cutter is reciprocably mounted on the support such that on a single pass of the cutter, a profiled cut is made on the one edge of the flexible material.

DETAILED DESCRIPTION

Figure 1:
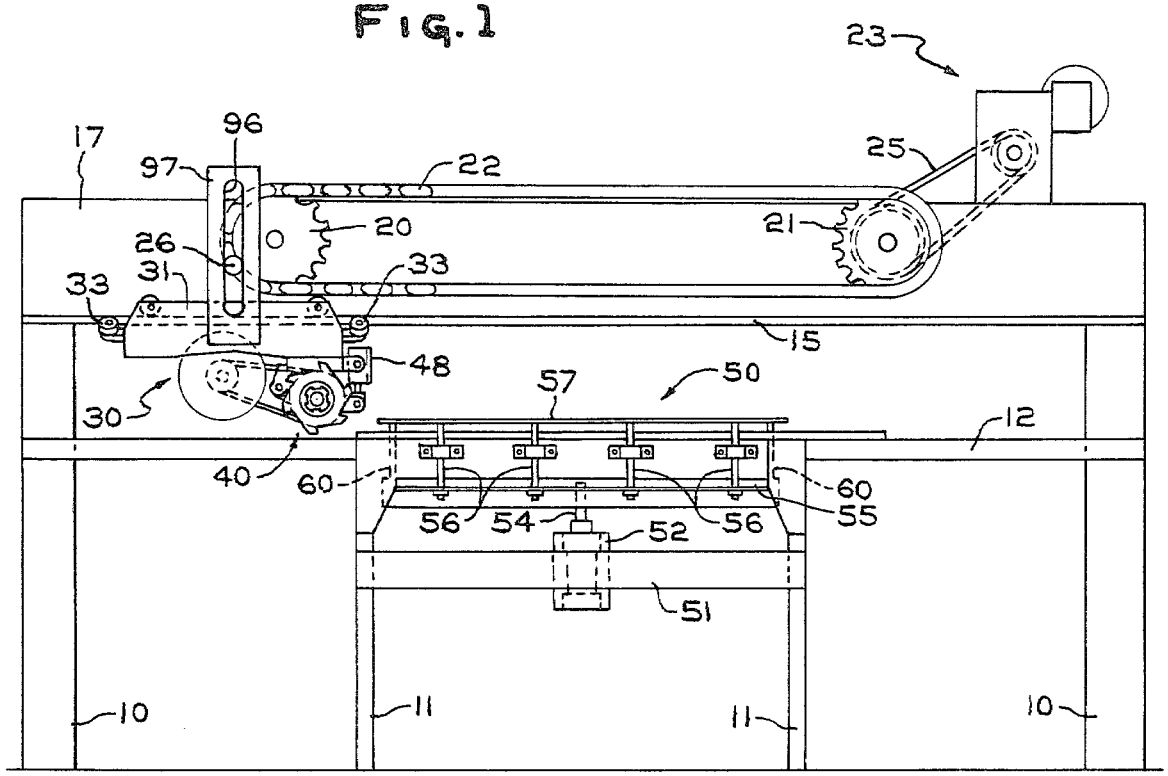
FIG. 1 is a side elevational view of a profile cutting apparatus.

Referring now to the drawings, wherein like refference numerals designate like or corresponding parts throughout the several views, there is shown in FIG. 1 a plurality of vertical supports 10, and 11. The supports 10 support a horizontally disposed table or work support 12 which supports the sleeve material 13. A pair of laterally spaced longitudinally extending guide rails 15 and 16 are suitably supported as by brackets 17 and 18 to the vertical supports 10. Sprockets 20 and 21 are journaled for rotation on bracket 17. An endless sprocket chain 22 is suitably trained about sprockets 20 and 21. A motor and transmission means 23 is mounted on brackets 17 and 18 having an output belt 25 connected to sprocket 21 to provide a drive means for the chain 22 and the sprocket 20. A drive pin 26 is suitably secured to one of the links of the chain 22 for a purpose to be described.

A carriage 30 having upwardly extending side portions 31 and 32 and a depending bracket 35 is journaled for reciprocal movement or guide rails 15 and 16 by spaced guide rollers 33.

Figure 2:
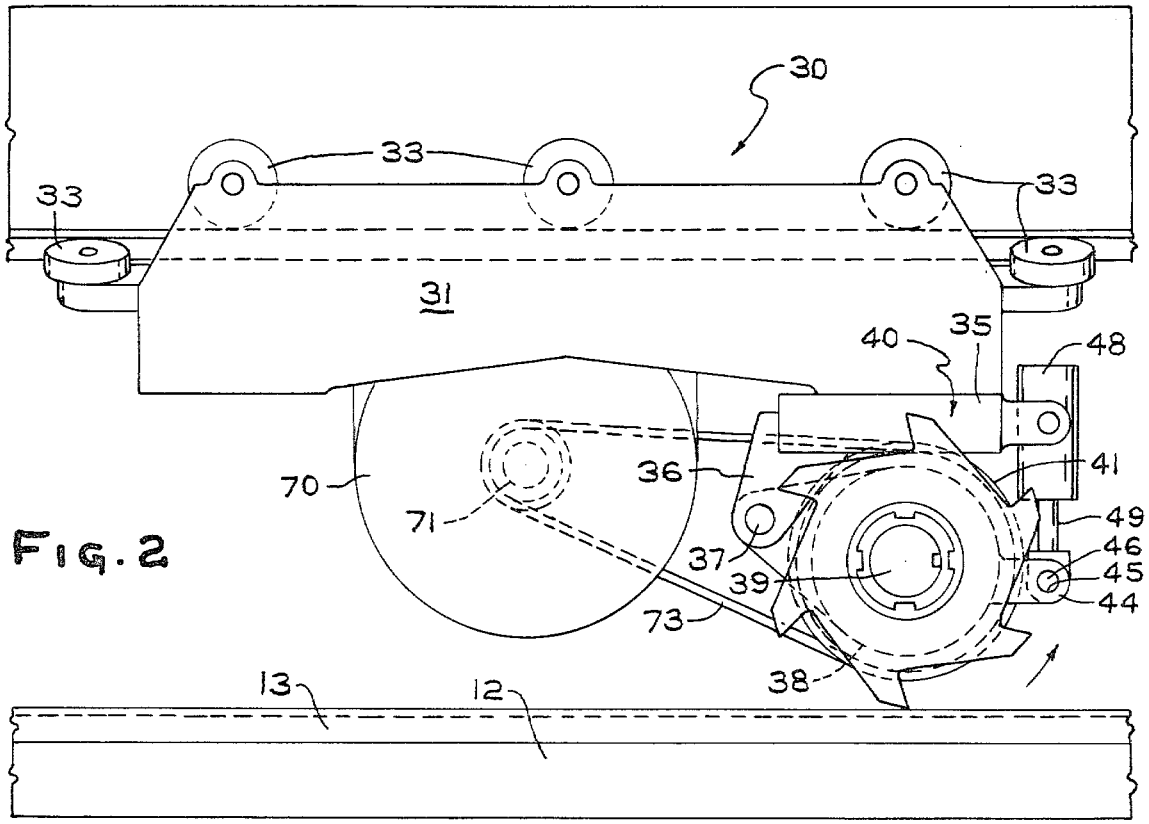
FIG. 2 is an enlarged fragmentary side elevational view of a carriage of the profile cutting apparatus.

Bracket 35 supports a pair of depending brackets 36, which brackets 36 support for rotation a shaft 37. A housing 38 has its rear portion journaled on such shaft 37 for pivotal movement in a manner to be described. Housing 38 supports a central shaft 39 on one end of which is keyed a profiled cutter 40 and on the other end a drive pulley 41. The forward portion of housing 38 has a clevis 44 suitably connected thereto. Clevis 44 has a bore 45 which receives a stud 46 for pivotally connecting the piston rod 49 of a pneumatic cylinder 48. The pneumatic cylinder 48 is pivotally connected to spaced braces 47 on bracket 35 of carriage 30. Upon pressurization of the head end of cylinder 48, the cylinder 48 and housing 38 are pivoted in a clockwise direction about shaft 37 as viewed in FIG. 2. This action moves the housing 38 and the profiled cutters 40 into cutting position in a manner to be described. Pressurization of the rod end of cylinder 48 moves the housing 38 into the position shown in FIG. 2, whereby the profiled cutters 40 are moved away from the sleeve material to be cut to permit retraction of the carriage 30 without damaging the sleeve material. A motor 70 is suitably secured to the carriage 30 having its output shaft 71 connected to a pulley 72. Pulley 72 has its output connected to drive pulley 41 by a belt 73.

Vertical supports 11 support a clamp means 50. Horizontally extending support braces 51 extending between supports 11 have a hydraulic cylinder 52 secured thereto. Extending outwardly from cylinder 52 is a piston rod 54 secured to a plate member 55. Plate member 55 has a plurality of guide rods 56 secured along the length of one side edge for movement therewith. Such guide rods 56 have a clamping bar 57 secured thereto for clamping one edge of the sleeve material to be cut. Plate member 55 in addition to supporting guide rods 56 has a pair of guide rods 60 secured along the length of the other side edge at the outboard ends thereof. Guide rods 60 have a clamping bar 63 secured thereto for cooperation with the other clamping bar 57. Pressurization of the rod end of cylinder 52 moves the plate member 55 downwardly as seen in FIG. 1 along with clamping bars 57 and 63 to secure the sleeve material for cutting.

Figure 3:
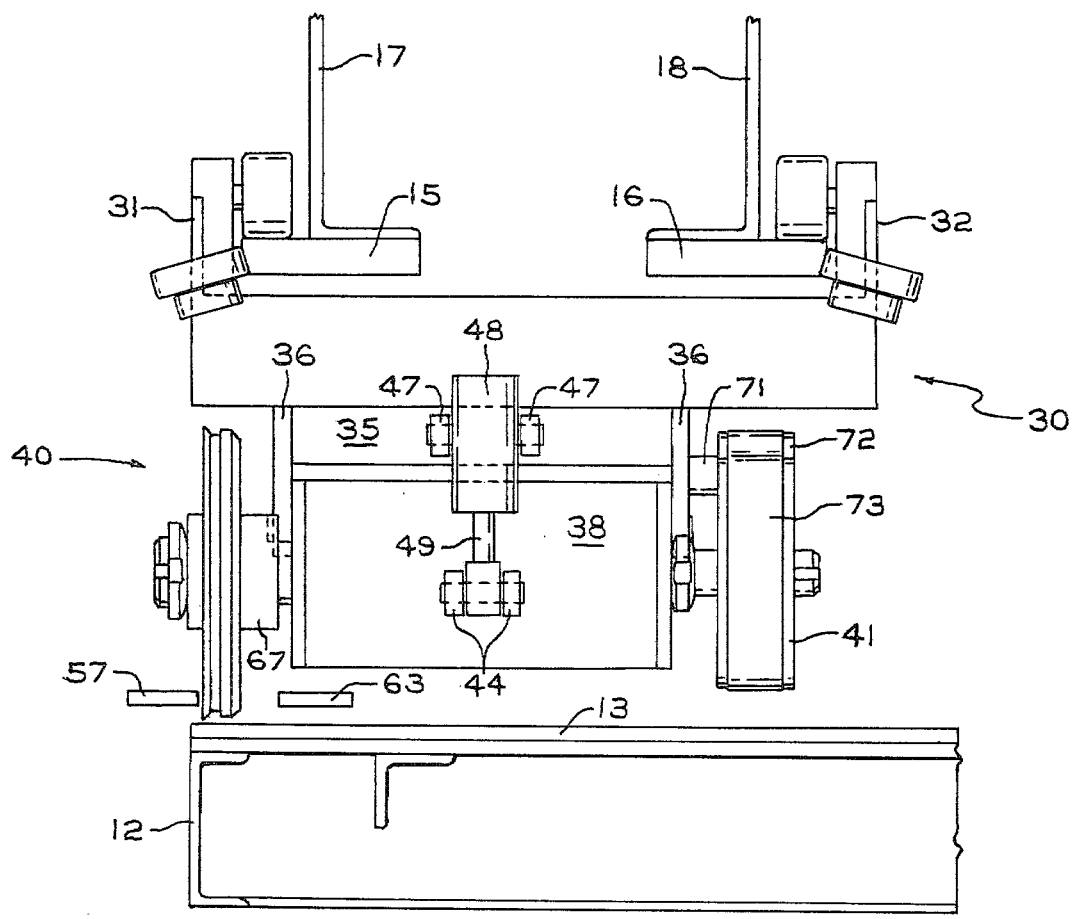
FIG. 3 is a front elevational view of the carriage and the profile cutters.
Figure 4:
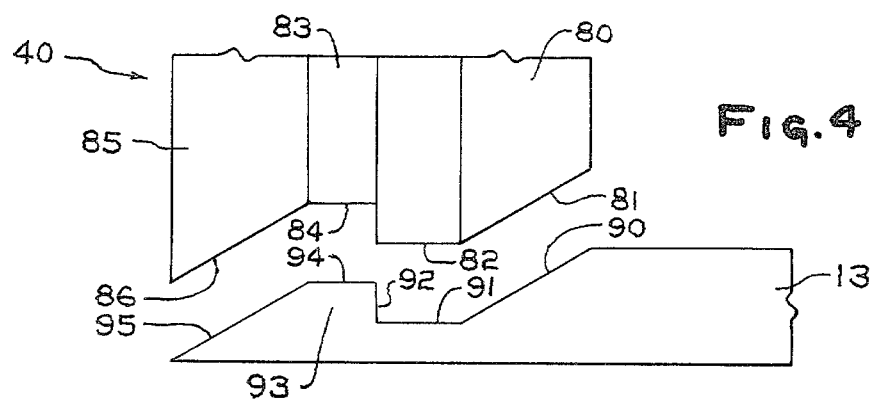
FIG. 4 is a cross sectional view of one edge of a sleeve after the completion of a cut by the profiled cutter.

The profiled cutter 40 as shown in FIG. 3 has a rotatable hub 67 on which is mounted a plurality of cutters. The first cutter 80 has a plurality of teeth with each tooth having a tapered surface portion 81 and a horizontally extending portion 82. The second cutter 83 has a plurality of teeth whose outer cutting edge 84 extend outwardly along a circumferential line that is smaller than the circumferential line defined by the horizontal portions 82 of cutter 80. The third cutter 85 has a plurality of teeth whose outer cutting edges have a tapered surface 86. With such profiled cutter, the end of a rectangular piece of rubberized material clamped between bars 57 and 63 is machined to have an inclined surface 90 that merges into a planar surface 91 substantially parallel to the inner peripheral surface of the sleeve or bladder material 13, followed by a wall 92 at a 90° angle to surface 91 to form a projection 93 with a planar surface 94 merging with an inclined surface 95.

In the operation of the described apparatus, a rectangular shaped material 13 is placed on the table of a clamp means 50. Hydraulic cylinder 52 is then energized, which moves the clamp bars 57 and 63 into abutting contact with the sleeve material 13. The head end of pneumatic cylinder 48 is then pressurized which pivots the profiled cutter 40 clockwise as viewed in FIG. 2 about shaft 71. Motor 70 is energized to rotate profiled cutter 40 about shaft 39 as motor and transmission means 23 is energized. Belt drive 25 rotates sprocket 21, which in turn drives sprocket chain 22 and pin 26 through an endless orbit. Pin 26 rides in the slot 96 of cam bracket 97, which bracket 97 is secured to carriage 30. As pin 26 moves through its orbit, carriage 30 will be reciprocated across the one end of rectangular shaped material 13. Only one pass of the profiled cutter 40 over material 13 is required. After completion of the cycle, the rectangular piece of material is turned end for end and a similar cut is made on the second end whereby the material can be thence coupled or interlocked at the respective ends to form a bladder.

We claim:

1. A bladder cutting apparatus having a support frame, a support table mounted on said support frame, a pair of laterally spaced vertically moveable bars for clamping a workpiece positioned for movement toward said support table, means connected to said bars for selectively moving said bars between a raised and a lowered position, guideways mounted above said support table, a carriage mounted on said guideways for reciprocal movement, power operated means mounted on said guideways interconnected to said carriage for reciprocating said carriage, a pair of laterally spaced lugs mounted on said carriage, a housing having one end pivotally mounted on said lugs, a pneumatic cylinder having a head end and a piston rod extending therefrom, said head end of said cylinder pivotally connected to the other end of said housing, said piston rod connected to said carriage, said housing supporting a profile cutter for rotation about a horizontal axis, drive means connected to said profile cutter for rotating said cutter, said power operated means connected to said carriage for reciprocating said carriage includes an endless chain mounted on said guideways for movement in an endless path, a pin mounted on said chain for orbital movement therewith, a cam bracket mounted on said carriage for movement therewith, a vertical slot in said cam bracket receiving said pin for moving said carriage and bracket in a reciprocating action, said profile cutter has a plurality of cutters, each cutter having a plurality of circumferentially spaced cutting edges, the profile of said cutting edges defining a pair of spaced inclined edges interconnected by a stepped horizontal edges to provide an interlocking profile.

2. A bladder cutting apparatus having a support frame, a support table mounted on said support frame for receiving a workpiece, a pair of laterally spaced vertically moveable bars for clamping a workpiece positioned on said support table, means connected to said bars for selectively moving said bars between a raised and a lowered claimping position, guideways mounted above said support table, a carriage mounted on said guideways for reciprocal movement thereon, power operated means mounted on said guideways and interconnected to said carriage for reciprocating said carriage across said table, a housing pivotally mounted on said carriage, a pneumatic cylinder having a head end and a piston rod extending therefrom, said head end of said cylinder pivotally connected to the said housing, said piston rod connected to said carriage, said housing supporting a profile cutter for rotation about a horizontal axis, drive means connected to said profile cutter for rotating said cutter, said profile cutter located between said pair of laterally spaced clamping bars, said profile cutter has a plurality of cutters, each of said cutters having a plurality of circumferentially spaced cutting edges, the profile of all of said cutting edges define spaced inclined edges interconnected by a stepped horizontal edges to provide an interlocking profile.

* * * * *